March 17, 1970  L. L. SPILLER  3,501,328
ELECTROSTATIC ADHERENT DEPOSITION OF RESINOUS POWDERS
Filed April 28, 1966
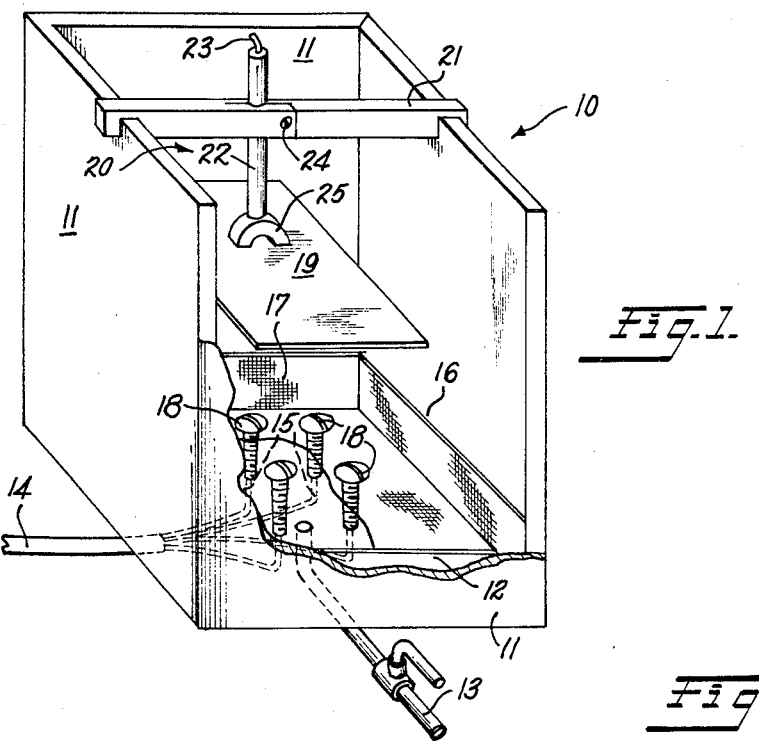
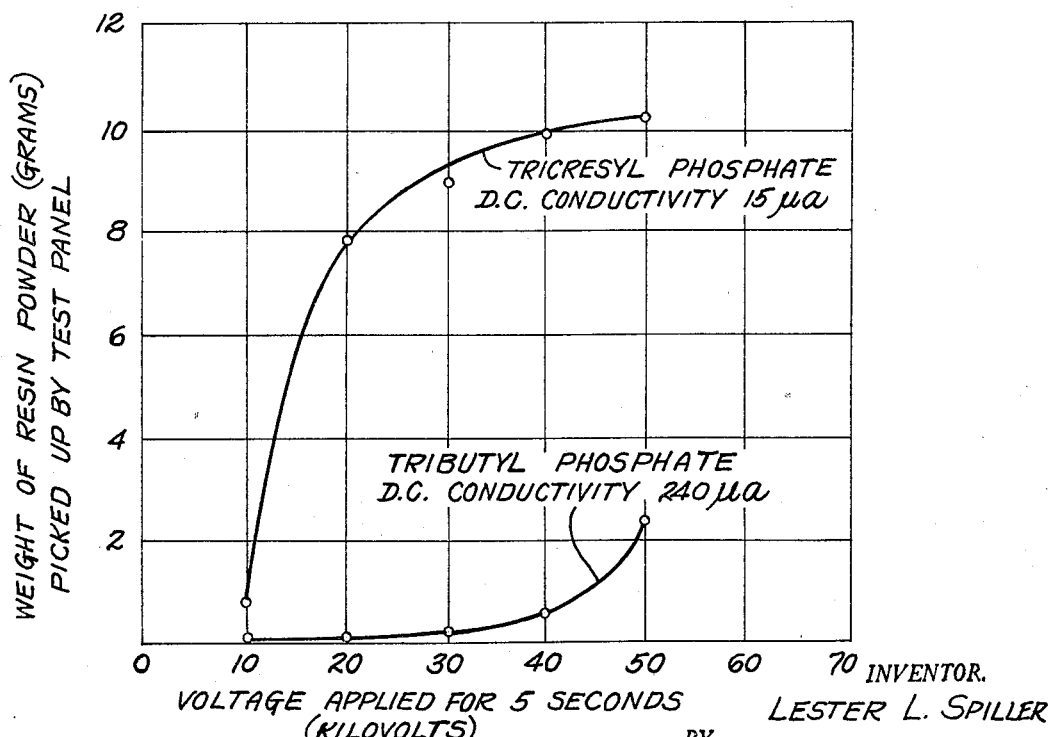
INVENTOR.
LESTER L. SPILLER
BY
Arnold G. Gulko
ATTORNEY

3,501,328
ELECTROSTATIC ADHERENT DEPOSITION OF RESINOUS POWDERS
Lester L. Spiller, Indianapolis, Ind., assignor to Ransburg Electro-Coating Corp., Indianapolis, Ind., a corporation of Indiana
Filed Apr. 28, 1966, Ser. No. 545,959
Int. Cl. G03g *13/00;* B44d *1/094*
U.S. Cl. 117—17    5 Claims

ABSTRACT OF THE DISCLOSURE

The adhesion of electrostatically deposited insulating resin particles to a grounded unheated piece is improved by surrounding the insulating particle with a surface layer of intermediate conductivity provided by coating with a plasticizer having a D.C. conductivity measured at 100 kilovolts of from 0.5–20 microamperes, such plasticizer being illustrated by tricresyl phosphate.

---

The present invention relates to the electrostatic adherent deposition of resinous powders on essentially unheated pieces, especially metal pieces of large size. The invention is particularly adapted to the electrostatic application of polymer particles of low dielectric constant, exemplified by polyvinyl chloride, polyethylene and polypropylene, onto large metal pieces of cast iron or steel, such as pipe, fire hydrants, lamp posts, girders and the like.

Modern industry is showing increasing interest in powder coating processes because of the capacity of this technique to provide thick coatings of relatively inexpensive resins to provide protection against corrosion and weathering. Although powder coating has been known for some time, this process has not attracted great attention until recent years when heat-softenable resin powders (frequently in the form of a fluid bed) were contacted with preheated objects (usually immersed within the bed) so that the heat of the object caused the resin powder to soften and stick to the object.

Unfortunately, the use of preheated objects has left much to be desired because precise control of coating temperature is not possible. Indeed, the temperature varies greatly throughout the thickness of the deposited coating, being much higher adjacent the preheated object. This is especially troublesome when resins having critical flow properties are used, such as polyvinyl chloride, polyethylene and polypropylene, or when thermosetting systems are employed in which the cure requires control of time at curing temperature, such as epoxy resin-epoxy hardening agent combinations. Even when the bulk of the applied resin powder flows properly or cures properly, difficulties can be encountered. Thus, when an excessive proportion of powdered resin is heat-adhered to a preheated substrate, the excess powdered resin does not flow properly yielding a rough finish instead of the smooth finish desired.

While almost any heat-softenable powdered resin may be used when adhesion with the substrate is achieved by the melting of the powdered resin in direct contact with the preheated substrate, this widespread applicability does not persist when one attempts to overcome the disadvantages inherent in the use of a preheated substrate by resort to other techniques of obtaining the desired temporary adhesion of the powder coating to the base until subsequently applied heat can be used to coalesce the resin particles and cause them to form a permanently adherent layer or coating.

Thus, the problem of the invention involves associating and adhering resin powders on essentially unheated work pieces and maintaining this association between the resin powder and the work piece by means of electrostatic forces until such time as the work piece with the powder adhered thereto can be subjected to an external heating influence which causes the resin particles to soften and flow together and form an adherent coating. In this way, precise control of coating temperature becomes possible enabling the flow and cure properties of the coatings to be accurately controlled.

The problem of the invention is not a new problem since others have attempted to employ electrostatic forces in the deposition of resin particles. However, many difficulties have been encountered. The main difficulty is to simultaneously obtain two apparently opposite results as follows.

First, the electrostatically charged particle must be conveyed and deposited on the target. This requires a particle of high conductivity in order that it might accept a high level of charge and then discharge this charge to the target in order to avoid the build-up of electrostatic force on the target which would repel further charged particles and thereby prevent their deposition. At the same time, it is essential that the deposited particle remain adherently associated with the target and this requires particles of low electrical conductivity in order that the particle, when deposited, will retain a charge sufficient to hold the particle in continued electrostatic association with the target.

The art has previously dealt with resin particles of uniform characteristics and it selected for use those resin particles having a compromise of properties, e.g., sacrificing one of the inconsistent properties in favor of the other and accepting the best balance which could be effected.

The present invention attempts, through the utilization of structured resin particles having a low conductive core and a surface of intermediate conductivity, to provide a situation in which the resin particles are easily charged, adequately conserve their charge on the way to the target, deposit well on the target, rapidly discharging the bulk of their charge in order to avoid preventing the deposition of further particles and, at the same time, retaining sufficient charge to hold onto the target for such time and sustaining such minimal vibrations as are required to bring the resin powder-coated product into a zone in which it can be subjected to the heat necessary to coalesce the resin particles to one another and to the work piece.

Without any intention of being bound to any particular theory of operation, it would appear that the insulating particles which are deposited in accordance with the invention possess a structure in which a zone of increased conductivity is present near the surface of the insulating particle with the interior of the particle constituting a core of reduced conductivity. When particles of this structure are charged, the charge is accepted and retained at the conductive surface of the particle and this surface charge induces a concentration of opposite charge in a central region within the core of the particle. Very high charge levels of the order of 10 kilovolts or higher are imposed on the outer surface of the core to enable the particle to be transported to the target. The induced opposite charge is therefore concentrated deep within the core of the particle. Between the induced charge within the insulating core and the outer conductive surface of the particle is an insulating core which is established by the limited penetration of the conductivity increasing agent into the particle.

When the particle is deposited, the transporting charge imposed upon the outer conductive surface is immediately discharged enabling the transporting electrostatic charge to be dissipated and further particles deposited. At the same time, the induced charge in the center of the particles must bleed out through the insulating core before this charge can be lost. In this manner, there is retained within each particle an adhesion promoting charge which enables the deposited particles to continue to be attracted to the substrate on which they are deposited.

In accordance with the invention, the modified insulating particles which are used are obtained by forming on the surface of the resin particle a layer of intermediate conductivity. Such a layer can be formed in diverse ways, e.g., by applying an intermediately conductive agent onto the surface of the resin particle or by impregnating the particles with a small proportion of conductivity increasing agent. This can be carried out with particular effectiveness by employing plasticizers having a given order of electrical conductivity and absorbing such plasticizers onto the surface of the resin particles to thereby provide a solvated surface layer having the required intermediate conductivity. In this way the modification of the resin particles can be carried out in a fashion which is permanent, fully compatible with desired resin properties and without interfering with the free flowing particulate nature of the resin used. Materials which exhibit a permanent dipole effect, such as high molecular weight linear polyesters of ethylene glycol and dimethyl terephthalate, are useful in prolonging the residual charge effect obtained in the invention.

Referring first to the application of plasticizer, there are numerous types of plasticizers, the invention being broadly independent of the specific chemical nature thereof. On the other hand, the selected plasticizer must have, measured on the liquid plasticizer per se, a D.C. conductivity at 100 kilovolts of from 0.5 to 20 microamperes, preferably from 2 to 15 microamperes.

D.C. conductivity is measured by subjecting a column of the liquid plasticizer ⅜" in diameter and 12" long to a D.C. potential of 100 kilovolts using brass electrodes having a surface area of 0.11 sq. in. The conductivity of the liquid is measured by observing the microamperes of current which flow through the column of liquid.

In most instances, the plasticizer used is liquid so that conductivity may be measured directly. On the other hand, some acceptable plasticizers are solids and these can be heated to place them in liquid form with the conductivity measured at the elevated temperature used for liquidification.

It is of interest to note that D.C. conductivity is a measure of the mobility of a charged particle. Accordingly, plasticizers of excessive D.C. conductivity unduly penetrate the insulating particle and, as a result, the appropriate combination of conductive surface and insulating core is not obtained. Instead, the region of conductivity reaches too far into the particle even when very small proportions of excessively conductive plasticizer are used, and, as a result, when the particle contacts the substrate, it substantially completely loses its charge and no residual charge is retained to maintain desired adherence.

The association of the particularate resin is easily effected by mixing the powdered resin and the liquid plasticizer, preferably together with a small amount of water, and warming the powder mixture on a heating mantle to an intermediate temperature favoring absorption of the liquid plasticizer onto the surface of the powdered resin, but not so high as to cause the resin particles to coalesce or agglomerate with one another. Essentially, one should remain below the softening point of the resin. Preferred temperatures are in the range of 120–225° F., more preferably in the range of 140–190° F. When the appropriate temperature is reached, mechanical agitation is continued until the liquid is uniformly distributed in the powder mixture and is no longer observable as a separate component. At this point the powder mixture is removed from the heating source and cooled, preferably by spreading the mixture out over a flat surface. A small amount of drier can now be added, if desired, and the mixture is stirred until the powder becomes free flowing. The drier is normally fresh unplasticized resin particles which serves to take up any residual surface plasticizer. The final powder product can be sifted through a screen or a piece of cheese cloth to remove any lumps which may have been formed and the product may, if desired, be further screened to select particles of uniform size which are more easily handled in a fluid bed.

The proportion of plasticizer to resin particles may vary to a considerable extent while still achieving, at least to some degree, the improvement contemplated by the invention. Generally, and based on the weight of the powdered resin which is modified, at least 10% by weight of plasticizer should be used, preferably at least 20%. Up to about 45% by weight of plasticizer may be tolerated, but preferably the proportion of plasticizer does not exceed 40%. Optimum proportions of plasticizer are between 25 and 35% by weight. Excessive proportions of plasicizer are to be avoided for, when such larger proportions are fully absorbed into the resin particle, the particle is excessively permeated by the plasticizer and the charge induced in the core bleeds off too rapidly.

The presence of a small amount of water is helpful to aid in assisting the uniform penetration of the resin particles by the plasticizer. It would seem that the small amount of moisture provides a humid atmosphere which helps to plasticize the surface of the resin particles. One percent by weight of water, based on the weight of the resin particles which are modified, constitutes a preferred proportion of water. On the other hands, the water may be entirely absent or proportions thereof up to about 5% or higher can be tolerated, but preferably less than 3% by weight of free water is present in the mixture.

The application of a drier as an after-treatment is wholly optional since the function of this component is simply to aid in the production of a free flowing particulate mass. Insofar as the invention is concerned, the invention requires the use of non-tacky, finely divided insulating particles of resin surfaced with an intermediately conductive layer, and the techniques used to provide these particles are of secondary importance.

The electrostatic application of powder coatings to work pieces is known and there are numerous publications which discuss equipment of diverse types which can be used for this purpose. The work which has been done in connection with the present invention has emphasized electrostatic transport using a fluidized bed technique for electrostatically charging the powdered resin and the equipment used in this regard will be detailed in this application. On the other hand, it is to be understood that the specific means employed to electrostatically charge the powdered resin or to place the charged resin particles in the general vicinity of the grounded work piece is not of importance to the invention so long as the resin particles are electrostatically charged and placed in the general vicinity of the work piece and the work piece is grounded or otherwise maintained at a relatively opposite polarity with respect to the electrostatic charge on the resin particles. Normally, the resin particles are charged with a negative electrostatic charge and the work piece is grounded, but the invention is not limited in this respect.

The structure used for the electrostatic application of resin powder is illustrated in the accompanying drawings which include a graphical presentation of some of the results which are obtained thereby. The figures of the drawing are identified as follows:

FIG. 1 is a perspective view of an illustrative structure useful in the invention, with parts broken away for clarity, and showing the electrostatic application of resin particles to a work piece utilizing a fluidized bed.

FIG. 2 is a graph comparing the deposition of powdered resin on a work piece at different charge levels and providing a comparison between resin particles modified by plasticizer selected in accordance with the invention with the same resin particles modified by a slightly different plasticizer which is not selected in accordance with the invention.

Referring more particularly to FIG. 1, the resin powder modified to include an intermediately conductive surface layer is formed into a fluidized bed and electrostatically charged while in the bed. The fluidized bed is formed by placing the modified powder into a box 10 open at the top. The box 10 is constructed of half inch plywood with each of the four sides measuring 7⅞" x 14". The base 12 of the box is apertured to receive an air line 13 and an electrical line 14 leading to cathodes 15. Approximately 3 inches above the base 12, a panel 17 of porous polyethylene is positioned by a slot 16 which extends around the inner periphery of the box. The porous polyethylene may be constituted by a fine mesh screen. Within the box 10, four round head screws 18 extend through the porous polyethylene panel 17 into the cathodes 15. The powdered resin rests on the panel 17 and is agitated into a fluid bed by air passing upwardly through the panel 17 and supplied by the air line 13. The agitated resin particles in the vicinity of the charged screw heads 18 become electrostatically charged thereby.

In the test chamber which has been constructed as indicated, a metal panel 19 is positioned within the box 10 at a distance of approximately 3–3½ inches above the top of the fluidized bed by means of an adjustable holder 20 which is constituted by an insulating cross bar 21 which rests on the top of the side panels 11 and to which is adjustably connected in any suitable manner, e.g., by set screw 24, a conductive anode rod 22 which is grounded by means of wire 23. The panel 19 may be held on to anode rod 22 by means of a magnet 25 secured to its lower end.

It will be noted that the fluidized bed is not shown in FIG. 1 for purposes of clarity but it will be understood that the bed is established atop the panel 17 with its top surface roughly 3 inches below the metal panel 19.

To assist in eliminating external confusion, the air supply may be passed through a dehumidifying chamber containing a silica gel desiccant. In this way, the humidity can be reduced from its normal value which varies around 12% to a more constant value of approximately 6% However, tests have shown that the effect of air humidity in the invention is not significant.

In order to utilize the equipment shown in FIG. 1 in an actual test, the panel 19 is preweighed and placed in the bed at a set distance of approximately 3 inches above the level of the fluid bed and the electrical equipment is turned on to charge the screw heads 18 to a predetermined voltage. The charge is maintained for a predetermined period of time, e.g., 5 seconds. The current is then turned off and the panel removed and weighed again to determine the amount of resin powder which has been deposited and retained by electrostatic forces and also to observe the capacity of the powder to adhere to the panel as the panel is moved or gently agitated.

The results obtained in accordance with the invention are illustrated with particular clarity through the utilization of phosphate plasticizers which constitute a common group of plasticizing substances. Two typical phosphate plasticizers are tributyl and tricresyl phosphate. Tributyl phosphate has a D.C. conductivity of 240 microamperes at 120 kilovolts and tricresyl phosphate had a conductivity of 15 microamperes on the same basis. These two different plasticizers were incorporated with polyvinyl chloride powdered resin having an average particle size of about 300 mesh utilizing 90 grams in each instance.

First, 3 grams of distilled water are added to 300 grams of dispersion grade polyvinyl chloride having an average particle size of about 250 mesh and the mixture is placed on a heating mantle and warmed to 140° F. while the mixture is stirred. At this point, 90 grams of the selected plasticizer are added and the agitation increased. When a temperature of 190° F. is reached as indicated by a thermometer placed in the agitated powder, the mixture is removed from the heating mantle and cooled by spreading it on a flat surface. Five additional grams of the unmodified resin powder are then added to the cooled powder with continued agitation until the powder is free flowing and the product is sifted through a sieve to remove lumps.

By utilizing the tributyl phosphate-modified resin particles and also the tricresyl phosphate-modified particles in the equipment shown in FIG. 1, the amount of powder which adhered to a 24 gauge steel panel having dimensions of 3" x 4¾" was determined for several predetermined voltages using an exposure time of 5 seconds at the predetermined voltage. The results obtained are graphed in FIG. 2 from which it will be seen that as soon as practical levels of voltage of about 20 kilovolts are applied, the tricresyl phosphate-modified powder effected a pickup of powder which is almost infinitely greater than was the case using tributyl phosphate-modified powder. Finally, and when much higher voltages of 50 kilovolts are used, some significant pickup of powder particles was effected when tributyl phosphate-modified powder was used, but it still does not compare with the pickup obtained with the tricresyl phosphate-modified powder at 20 kilovolts.

The particle size of the resin particles is a factor of secondary importance. Broadly, particles of the order of 100 to 600 mesh in size may be employed in accordance with the invention, but powder particles of the order of 200 to 400 mesh in size are preferred. Similarly, the shape of the particle is of secondary consideration, but it is preferred that the particle be substantially round. As is well known, electrostatic charges tend to accumulate on pointed portions of any object and the use of round particles avoids this disadvantage. On the other hand, the disadvantage can be tolerated and the benefits of the invention are still retained to a significant extent.

Reference has been made to the use of essentially unheated work pieces. In this regard it will be understood that so long as the work piece is below a temperature causing coalescence of the resin particles deposited on the work piece, it is essentially unheated. It will be observed that electrostatic force can be used to deposit resin particles on a heater work piece with adhesion being effected by coalescence of the resin particles. However, this again makes it necessary to control the thickness of the coating by the sensible heat of the work piece and precise control of the temperature of the coating is lost. On the other hand, a work piece heated just below a temperature causing particle coalescence can be used to minimize the need for external heating or to minimize the temperature gradient needed for external heat to penetrate to the work piece surface in a practical period of time.

I claim:
1. A method for the electrostatic adherent deposition of dry solid resin particles on essentially unheated electrically conductive pieces comprising, electrostatically charging dry resin particles selected to possess an insulating core and a surface layer of intermediate conductivity provided by absorbing into the surface of said resin particles of an intermediately conductive plasticizer for said resin particles having a D.C. conductivity measured at 100 kilovolts of from 0.5–20 microamperes positioning said electrostatically charged particles of dry solid resin in the general vicinity of said unheated pieces, and maintaining the surface of said pieces at a relative opposite polarity with respect to the electrostatic charge on said resin particles to cause said particles to be electrostatically attracted to said pieces, said surface layer of intermediate conductivity facilitating the charging of said resin particles, the conservation of said charge as said partcles move to said pieces and, at the same time, causing said particles to retain sufficient charge to remain in electrostatic adherent association with said pieces.

2. A method as recited in claim 1 in which said plasticizer is employed in an amount of from 10–45% by weight, based on the weight of said resin particles.

3. A method as recited in claim 2 in which the resin of said resin particles is selected from the group consisting of polyethylene, polypropylene and polyvinyl chloride.

4. A method as recited in claim 3 in which said plasticizer is present in an amount of from 25–35%, based on the weight of said resin particles, and said plasticizer has a D.C. conductivity measured at 100 kilovolts of from 2–15 microamperes.

5. A method as recited in claim 1 in which said charged resin particles are maintained in a fluid bed and said pieces are suspended close to said bed and over the upper surface thereof.

References Cited

UNITED STATES PATENTS

| | | | |
|---|---|---|---|
| 3,342,621 | 9/1967 | Point et al. | 117—17 |
| 2,683,669 | 7/1954 | Coler | 117—100 X |
| 2,989,782 | 6/1961 | Barkhuff et al. | 117—100 X |
| 2,992,456 | 7/1961 | Pearson | 117—100 X |
| 3,017,714 | 1/1962 | Slosberg et al. | 117—100 X |
| 3,035,003 | 5/1962 | Kessler | 117—100 X |
| 3,196,032 | 7/1965 | Seymour | 117—100 X |
| 3,248,253 | 4/1966 | Bardford et al. | 117—17 |
| 3,323,933 | 6/1967 | Bardford et al. | 117—17 |
| 3,336,903 | 8/1967 | Point | 117—17 X |

OTHER REFERENCES

Buttrey, "Plasticizers" 1960, Franklin Publishing Co., Second American Edition, pages 32–35.

Mellan, Ibert, "Industrial Plasticizers" 1963, The Macmillan Co., pages 205–208.

WILLIAM D. MARTIN, Primary Examiner

E. J. CABIC, Assistant Examiner

U.S. Cl. X.R.

117—100